UNITED STATES PATENT OFFICE.

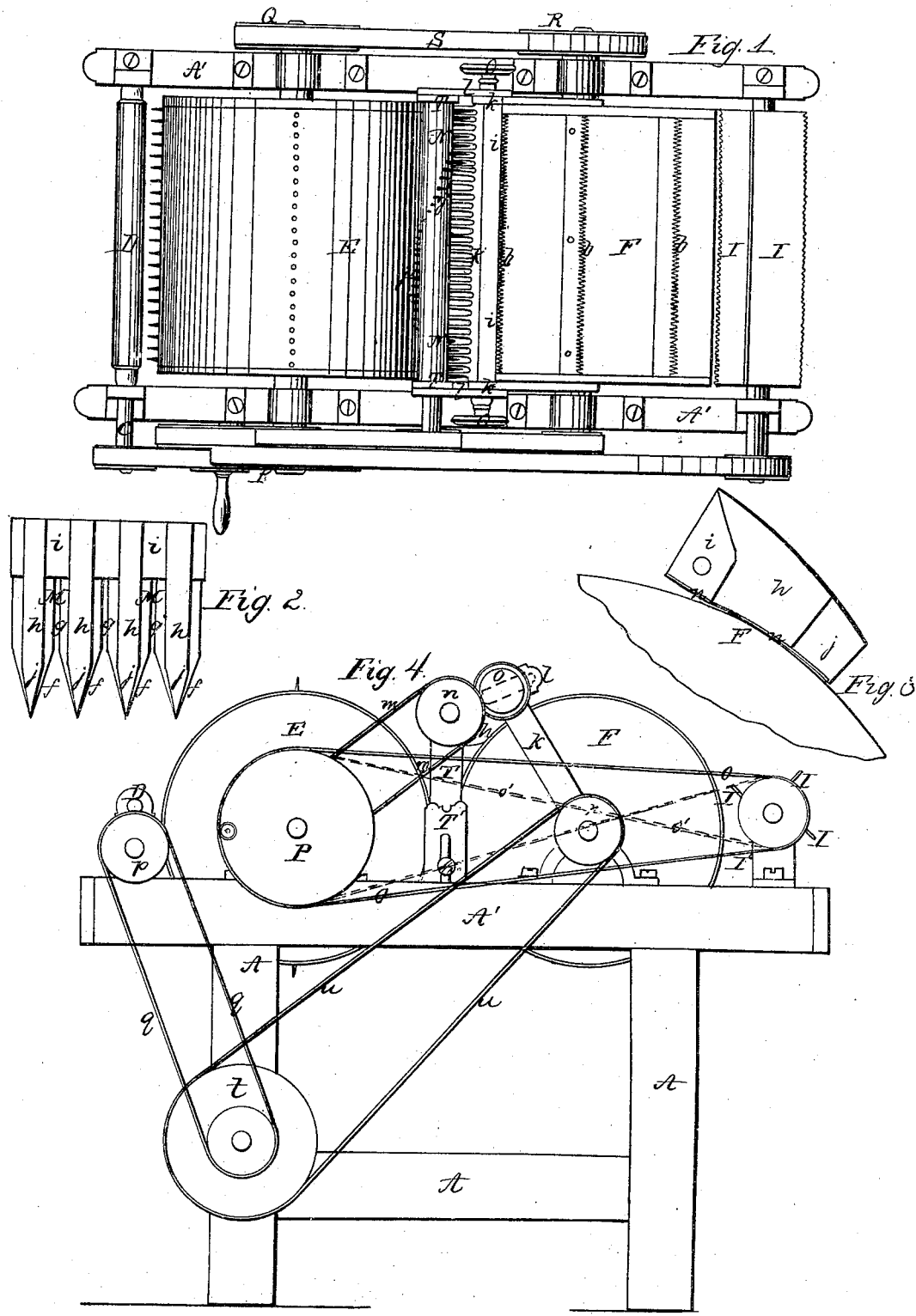

FRANCIS A. CALVERT, OF LOWELL, MASSACHUSETTS.

MACHINE FOR GINNING, BURRING, OR CLEANSING WOOL AND COTTON.

Specification of Letters Patent No. 2,373, dated November 25, 1841.

*To all whom it may concern:*

Be it known that I, FRANCIS A. CALVERT, of Lowell, in the county of Middlesex and State of Massachusetts, have invented certain Improvements in Machines for Ginning, Burring, or Cleansing Wool and Cotton, so as to Free Them from Burs, Seeds, and other Foreign Substances; and I do hereby declare that the following is a full and exact description thereof.

The general principle upon which this machine operates is the same with that invented and applied to the same purpose, by William W. Calvert and Alanson Crane; and like it the principal difference between it and some other machines which have been heretofore employed for burring and cleansing wool and cotton consists in substituting for the knife or guard formerly used to arrest and separate the burs, seeds, and other foreign matter from the animal or vegetable fibers to be cleaned, an apparatus, which shall operate upon such fibers in a manner analagous to that of picking out such foreign matter by hand. But instead of projecting edges of a revolving fluted, or channeled roller to strike against the burs and other foreign matter, as used in Calvert and Crane's machine, I employ what I denominate an angular toothed guard, which is made of sheet metal, in a manner to be presently described, and which has openings or slots, between each of its teeth, into which openings or slots, the pointed wires, or teeth of a revolving cylinder or roller, which I denominate the intersecting toothed cylinder, or roller, pass, as said cylinder is made to revolve; the intention of this combined apparatus being the same with that of the revolving fluted, or channeled cylinder in Calvert and Crane's machine.

In the accompanying drawing, Figure 1, is a top view of my machine; in this figure the feeding apron is not shown, it being the same in all respects with that generally used. C, is the shaft of one of the rollers of this apron, and D, the top, or pressing roller. E, is the picker cylinder, which is to be set with rows of teeth in the usual way. F, is the doffer, or fine comb cylinder; this cylinder and its combs are similar in all respects, with those used and described by Calvert and Crane in the specification of their patent; they are shown at $b, b$. I, I, are doffing plates, which operate, and may be employed in lieu of the brush cylinder used in other machines, and which may also be used in this. K, is the angular toothed guard, by means of which, and of the teeth on the intersecting toothed cylinder N, the burs, seeds, motes, or other foreign matters are to be separated. The angular toothed guard is formed in the following manner.

In Fig. 2 M, M, represents a portion of that part of the guard which lies over, and nearly in contact with the fine comb cylinder; it consists of a plate of metal; a piece of tempered steel, such as is used for saw plates being best adapted to the purpose. This plate must be of the length of the fine comb cylinder, and it is to have teeth cut upon one of its edges, along its whole length, as shown at $f, f, f$; from the angles produced by the junction of these teeth openings, or slots, as shown at $g, g, g$, are to be cut through the plate, and it is to be curved crosswise, so as to adapt it to the curvature of the fine comb cylinder. Plates or pieces of cast iron, $h, h, h$, are to be attached to the plate M, between the edges of each of the teeth, so as to rise vertically from them, and extending from thin points to the upper ends of the slots $g, g, g$, or to the rod or bar $i, i$, to which the steel or iron plates are affixed. In the actual machine these plates are about half an inch thick, excepting toward their outer or lower ends $j, j, j$, where they are pointed, or chamfered, so as to correspond with the form of the teeth in the steel plate. This chamfered part of the iron plates should be allowed to stand a little within the slope of the teeth, as shown in the drawing, as the steel plate will then operate better in separating the burs and other foreign matter than when the iron and steel teeth are flush with each other. In Fig. 2, the steel plate and teeth are represented as of about one-half their width and size in the actual machine, the openings or slots $g, g, g$, being about an inch apart.

Fig. 3 is an end view of the angular tooth guard—$h$, being one of the iron plates; M, M, the steel plate; $i$, the bar or rod forming the back edge of the guard; and F, a part of the fine comb cylinder. The steel and the iron plates may be attached to each other by means of screws passed through the former, and tapped into the latter. To prevent the fibers from passing between the steel and the iron plates at their points, it will be best to allow the extreme points of the teeth of the steel plate to be imbedded in that of the iron, the latter being elongated, and notched for that purpose.

N, N, Fig. 1, is the intersecting toothed roller or cylinder. The teeth j', j', j', in the cylinder are set spirally around it, so as to act successively upon the material to be picked, and they are placed an inch apart, or at such distance as to correspond with the slots or openings g, g, g, in the steel plate M, M. The teeth must be of such length as to enable the cylinder to revolve clear of the iron plates h, h, h, and to allow them to enter the openings or slots g, g, g, in the steel plate; the iron plates are sometimes made much wider than in the proportion shown in Fig. 3, and the teeth must in this case be made of a corresponding length. The cylinder N, N, is made adjustable, so that it may be raised, or lowered, and that its teeth may enter to a greater or less depth into the angular toothed guard; and this guard also is made adjustable endwise, in order to affix it in such manner as that the teeth of the intersecting cylinder may duly correspond to the openings or slots in the guard plate. O, O, are adjusting nuts which fit onto screws at either end of the bar i, i, of the guard, and bear against the standards k, k, which support said guard, and which has sufficient end play to allow of the necessary adjustment. The lower end of the standards k, k, have holes in them which pass on to the gudgeons of the cylinder, F. The nuts O, O, serve also to regulate the depth or distance to which the intersecting teeth of the cylinder N, shall enter the steel plate of the guard; l, l, are bridles which embrace the axes of the cylinder N, and which also admit the ends of the bar i, i, to pass through longitudinal slots in them, in a manner which will be more clearly seen in Fig. 4, and by which the nuts O, O, are made to regulate the distance of the cylinder N, from the guard.

Fig. 4, is a side view of the machine showing the manner in which the respective cylinders may be driven by means of which and bands, P, is a whirl or pulley on the shaft of the picker cylinder, to which shaft may also be appended a loose pulley, and to these the driving power may be applied. On the opposite end of this shaft is a pulley Q (Fig. 1), and on the shaft of the fine comb cylinder a whirl R, upon which the belt S, operates. In Fig. 4 m, m, is a band from a whirl on the shaft of the picker cylinder, which gives motion to the pulley n, on the shaft of the cylinder N; and o, o, a band from P, which drives the brush cylinder on doffing plates I, I; but this band must be crossed, as shown by the dotted lines o', o'. A whirl p, on the shaft of one of the feeding rollers gives motion to the endless apron, being driven by a band q, q, connected with the whirl r, on the shaft of the fine comb cylinder, by the intermediate whirl t, and the band u, u. These bands and whirls may be differently arranged, or other modes of correcting and driving the respective parts may be adopted, as will be well understood by every competent machinist. T, is one of the standards, which supports the intersecting toothed cylinder, there being a corresponding standard at the opposite end. These standards may be raised or lowered by means of a set screw v, passing through T'; or otherwise; l, is one of the bridles against which the nut O, operates, the slot or mortise in the bridle being shown by dotted lines; the standards or bars k, k, which support the angular toothed guard, as before remarked, embrace, at their lower ends, the gudgeons of the fine comb cylinder.

In operating with this machine, as the fine comb cylinder brings the wool or cotton, with its burs, or motes, into contact with the sloping edges of the teeth of the angular toothed guard, the burs or other foreign matter are gradually acted upon by them, their inclined position preventing any sudden action which might injure the fibers, and gradually separating such foreign matter, as it approaches the point of the junction of the contiguous teeth. The burs, seeds, or motes are there met by the points of the teeth of the intersecting toothed cylinder by which they are separated from the fibers, are beaten back, and fall down under the machine, passing between the rounds or slots of the grating on the under side of the picker cylinder, as in other machines for a like purpose.

Having thus fully described the nature of my machine for burring and otherwise cleaning wool, or cotton, what I claim therein, and desire to secure by Letters Patent, is—

The manner in which I have constructed what I have denominated the angular toothed guard, and combined the same with the revolving intersecting toothed cylinder; the angular toothed guard lying upon the fine comb cylinder, and separating the burs and other foreign matter by the action of the oblique edges of its teeth, and such foreign matter being finally beaten off by the revolving intersecting teeth of the cylinder N, as herein set forth; the respective parts being made adjustable, and being constructed and operating substantially in the manner described.

FRANCIS A. CALVERT.

Witnesses:
 HENRY D. PHELPS,
 ARTEMAS G. TYLER.